No. 694,156. Patented Feb. 25, 1902.
T. C. JOHNSON.
TAKE DOWN SCREW.
(Application filed Aug. 16, 1901.)

(No Model.)

Witnesses
J. H. Shumway
Lillian D. Kelsey

Thomas C. Johnson
Inventor
By Atty's Seymour and Earle

UNITED STATES PATENT OFFICE.

THOMAS C. JOHNSON, OF NEW HAVEN, CONNECTICUT, ASSIGNOR TO THE WINCHESTER REPEATING ARMS CO., OF NEW HAVEN, CONNECTICUT, A CORPORATION.

TAKE-DOWN SCREW.

SPECIFICATION forming part of Letters Patent No. 694,156, dated February 25, 1902.

Application filed August 16, 1901. Serial No. 72,237. (No model.)

*To all whom it may concern:*

Be it known that I, THOMAS C. JOHNSON, of New Haven, in the county of New Haven and State of Connecticut, have invented a new and useful Improvement in Take-Down Guns; and I do hereby declare the following, when taken in connection with the accompanying drawings and the letters of reference marked thereon, to be a full, clear, and exact description of the same, and which said drawings constitute part of this specification, and represent, in—

Figure 1:
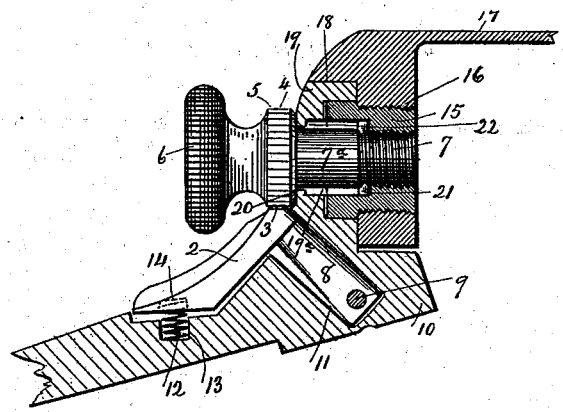
Figure 2:
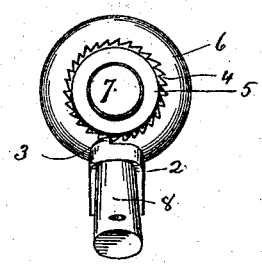
Figure 3:
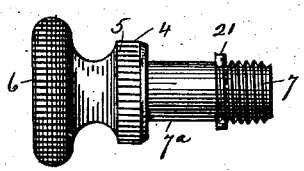
Figure 4:

Figure 1, a broken view, in vertical section, of one form which my invention may assume; Fig. 2, a detached view in front elevation of the take-down screw and safety-dog; Fig. 3, a detached plan view of the screw; Fig. 4, a corresponding view of the safety-dog.

My invention relates to an improvement in take-down firearms, and constitutes an improvement upon the arm for which under date of April 26, 1901, I filed an application serially numbered 57,563, the object of my present invention being to firmly secure the take-down screw against disturbance when in its home position.

With these ends in view my invention consists in the combination, with the take-down screw of a take-down gun, of a safety-dog co-acting with the screw to lock it in its home position.

My invention further consists in certain details of construction and combinations of parts, as will be hereinafter described, and pointed out in the claims.

In carrying out my invention, as herein shown, I employ a safety-dog 2, formed with a tooth 3, adapted to engage with the teeth 4 of a ratchet 5, formed at the inner end of the knurled head 6 of the take-down screw 7. The said dog 2 is formed with a forwardly-extending arm 8, the extreme forward end of which receives a pivot-pin 9, located in the upper prong 10 of the tang of the gun, the dog vibrating upon the said pivot-pin. The said dog is located in a suitable recess 11, cut into the upper face of the said prong, and is maintained in its lifted or screw-locking position by means of a spiral spring 12, inserted into a socket 13, leading out of the bottom of the outer end of the recess 11. The upper end of this spring enters a shallow recess 14, formed in the outer end of a dog, which normally projects above the upper face of the upper tang. To retire the dog and unlock the screw, the user of the arm places his finger upon the outer end of the dog and presses downward upon it, whereby the tension of the spring 12 is overcome and the dog swung down upon its pivot 9, so as to clear its tooth 3 from the tooth 4 of the ratchet 5 with which it is engaged at the time. The screw 7 may then be unscrewed. In unscrewing the screw the downward pressure of the dog upon the spring must be maintained until after the screw has been unscrewed sufficiently to clear the tooth 4 of the ratchet 5 from the tooth 3 of the dog, after which the screw may be unscrewed without any reference to the dog. On the other hand, when the screw is being turned inward the teeth 4 of the ratchet 5 simply snaps over the tooth 3 of the dog on account of their beveled shape, as clearly shown in Fig. 2. The screw 7, as herein shown, enters into an internally-threaded take-down bushing 15, which is also externally threaded to adapt it to be screwed into a threaded opening 16, formed for its reception in the rear end of the receiver 17, which is formed with a rearwardly-opening recess 18 for the reception of an upwardly-extending take-down arm or lug 19, formed integral with the said upper prong 10 and carrying the screw 7, which is formed with a long stem or shank 7ª, passing through an opening 20, formed to receive it in the arm or lug 19, the inner face of which is formed with a recess 19ª for the reception of the outer end of the bushing 15. The screw is free to play back and forth in the opening 20 within the limits of the shank 7ª of the said screw, which is prevented from being pulled rearwardly out of the arm 19 by means of a transversely-arranged stop-pin 21, which is inserted into the screw after it has been passed through the opening 20 in the arm 19. This pin is longer than the diameter of the screw 7 and engages with a shoulder 22, formed at the rear end of the opening 20, as shown in Fig. 1.

It is apparent that my invention is not limited to use in connection with the particular construction shown and described herein, but that it comprehends the use of a safety locking-dog in conjunction with any take-down screw in a take-down gun. When the safety-dog is performing its function, it positively holds the take-down screw against rotation in the direction of unscrewing from any cause, such as the jarring of firing and handling. I would therefore have it understood that I do not limit myself to the exact construction and arrangement of parts herein shown and described, but hold myself at liberty to make such alterations as fairly fall within the spirit and scope of my invention.

Having fully described my invention, what I claim as new, and desire to secure by Letters Patent, is—

1. In a take-down gun, the combination with a gun-frame having a recess formed in it, of a take-down screw, and a safety-dog located within the said recess and formed with a tooth adapted to engage with a screw to hold the same against unscrewing rotation when in its home position.

2. In a take-down gun, the combination with the receiver and the tang thereof, of a take-down screw mounted in the tang and entering the receiver, and a safety-dog located in a recess formed in the tang and coacting with the screw for locking the same against unscrewing when in its home position.

3. In a take-down gun, the combination with a take-down screw, of a safety-dog located within a recess in a portion of the frame of the gun, and formed with a tooth adapted to engage with the screw to hold the same against unscrewing rotation when in its home position, and a spring coacting with the dog to hold the same in its locking position.

4. In a take-down gun, the combination with the receiver thereof, of a bushing located therein, a tang formed with an upwardly-projecting arm and with a recess, a take-down screw mounted in the said arm, having free longitudinal movement therein, and adapted to enter the said bushing for firmly binding the receiver to the tang, and a safety-dog located in the recess of the tang, and coacting with the screw for locking the same against unscrewing rotation when in its home position.

In testimony whereof I have signed this specification in the presence of two subscribing witnesses.

THOMAS C. JOHNSON.

Witnesses:
FREDERIC C. EARLE,
J. H. SHUMWAY.